No. 770,840. PATENTED SEPT. 27, 1904.
W. C. BAKER.
THRUST BEARING.
APPLICATION FILED JULY 25, 1901.
NO MODEL.
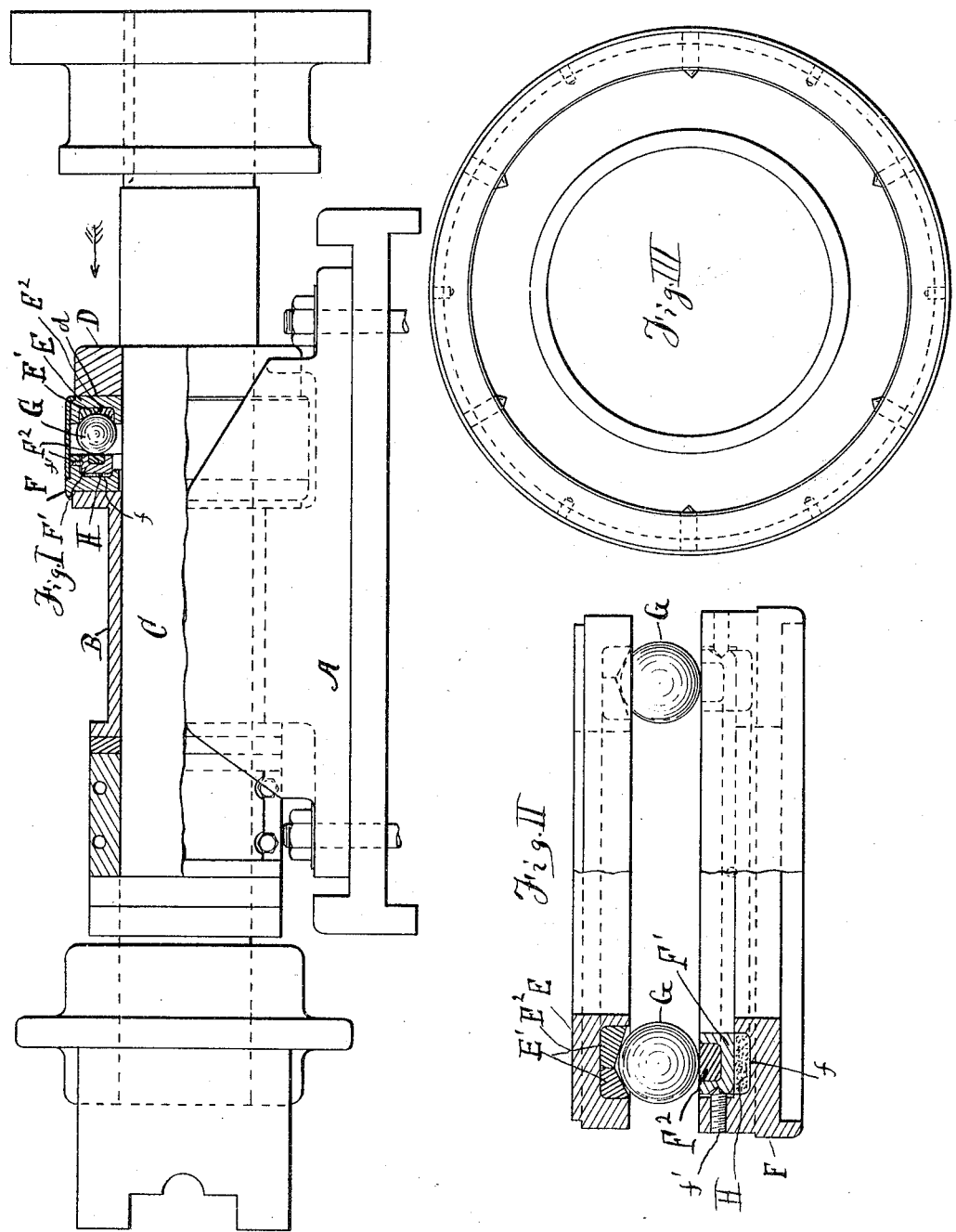
Witnesses:
A. L. Lord
E. B. Donnelly
Inventor:
Walter C. Baker
by
W. C. Donnelly
his Atty.

No. 770,840. Patented September 27, 1904.

UNITED STATES PATENT OFFICE.

WALTER C. BAKER, OF CLEVELAND, OHIO, ASSIGNOR TO THE AMERICAN BALL-BEARING COMPANY, OF CLEVELAND, OHIO, A CORPORATION OF OHIO.

THRUST-BEARING.

SPECIFICATION forming part of Letters Patent No. 770,840, dated September 27, 1904.

Application filed July 25, 1901. Serial No. 70,193. (No model.)

*To all whom it may concern:*

Be it known that I, WALTER C. BAKER, a citizen of the United States, residing at Cleveland, in the county of Cuyahoga and State of Ohio, have invented certain new and useful Improvements in Thrust-Bearings; and I hereby declare the following to be a full, clear, and exact description of my invention, such as will enable others skilled in the art to which it pertains to make and use the same.

My invention relates to thrust-bearings, and more especially to antifriction thrust-bearings especially adapted to be used in connection with shafts of propeller-wheels for the purpose of sustaining the thrust from the propeller-wheel to the shaft and thence to the bearing.

The object of my invention is to construct a bearing in which the friction is reduced to a minimum both by the introduction of hardened balls and races between the parts which are constructed or intended to sustain the thrust and by the peculiar construction of the antifriction-bearing parts, whereby unequal strains or thrusts are compensated for to such an extent as to first cushion them and at the same time prevent unequal wear or binding of the parts.

With the above objects in view my invention consists in the following organization of the parts and also in the constructive features of the same, all of which will be hereinafter fully set forth and claimed.

In the drawings, Figure I is a part-sectional view of a bearing embodying my invention. Fig. II is a part-sectional view, enlarged, illustrating more clearly the construction of the bearing which sustains the thrust. Fig. III is a view in elevation of the recessed ring which is adapted to contain the self-adjusting or compensating track or race of the bearing.

A represents the standard of the bearing, which is rigidly secured in any suitable manner in proper position and secured so as to sustain the stress. Upon the standard A is mounted the shaft-bearing proper, B, which is suitably finished or bored to bear the shaft C and allow the same to freely revolve within the bearing.

At one end of the bearing B, and preferably at that end nearest the propeller-wheel, I locate a thrust-bearing which is constructed with the following features:

D represents a collar which is secured to or may be formed integral with the shaft C, and hence the said collar rotates with the shaft C and acts to sustain the longitudinal thrust of said shaft incident to the operation of the propeller in advancing the vessel or in the direction of the arrow. Any suitable means may be employed for securing this collar to the shaft C, so that it be capable of sustaining a predetermined maximum amount of stress. Located against the shoulder $d$, formed by this collar D, is a recessed ring E of either forged or cast metal. This ring E may be so constructed as to travel with the collar D in the rotation of the same or may be made loose, so as to move independent thereof, which is the preferable way of constructing the same and assembling the parts, since less friction will result than should the ring rotate continuously with the collar, in which event a continuous wear would be upon the balls, referred to later on.

F represents an annular recessed ring of forged or cast metal, which is connected to the bearing B in such a manner that it may be stationary with said bearing or may rotate or move in a rotary direction independent of said bearing, the latter being the preferable mode of assemblage and operation, since less wear will be upon the balls should the same rotate, in which event the ring F can rotate, and thereby diminish friction between the several parts.

Within the recessed ring E, I insert a bearing-ring formed in sections $E'$ $E^2$ and provided at its bearing-face with a V-shaped race, thus forming a running contact between the balls G and said race at two points. (See Fig. II.) The recessed portion of the ring F is also so constructed as to form a seat for a ring $F'$, which in turn is recessed for the reception of a hardened ring $F^2$, the outer face of which constitutes a flat race. The ring $F'$ fits snugly within the recess of the ring F, but in such manner that it is capable of movement within said recess. A backing or packing H is interposed between the inner face of the ring F' and the inner face $f$ of the ring F. The backing or packing H is formed of some compressible material—such as felt, leather, or the like—and is compressed between the parts to an extent equal to that necessary to sustain almost a maximum amount of the thrust force or stress, and when thus compressed the ring F' is secured in place (see Fig. II) by means of set-screws $f'$, which are pointed and received within a V-shaped peripheral groove of such area that it prevents said ring from giving away to the elastic force of the packing in a direction toward the balls G, but will allow of a further compression of said compressible material under any inequality of the shaft or unequal distribution of the thrust force.

It will be noticed by examination of Figs. I and II that the balls G bear upon the race provided by the sections $E'$ $E^2$ by two points, while in the other instance the ball bears upon the flat race provided by the ring $F^2$ at one point only. The object in thus constructing the ball-races and assembling the parts is to prevent the balls G from cramping between the rings $E'$, $E^2$, and $F^2$ by an unequal strain upon the propeller-shaft B or any inequality owing to temporary distortion of the shaft subsequent to any unequal strain.

From the above it will be seen that the thrust force on the shaft B is sustained by the antifriction-bearing comprising the rings $E'$, $E^2$, and $F^2$ and the balls G and that when the said propeller is acting at any one of its parts against a force, such as is caused when the propeller is partially out of the water, the packing or backing H will give at this point of stress, thus keeping the balls and races in approximately uniform relation and preventing the cramping or undue wearing or crushing of the parts.

While I have set forth my invention as being especially applicable for receiving the thrust of a propeller-shaft, it is obvious that it may be applied to other uses by slight modification of the parts, and hence I do not limit myself in this invention to the exact detail or assemblage of parts as above set forth.

What I claim is—

1. In combination with a shaft, a thrust-bearing comprising a pair of rings encircling the shaft, said rings having their inner faces recessed, compressible material arranged in one of said recesses, a second ring bearing on said compressible material, means arranged in the recess of the other of the first-named rings, and formed with a ball-race, means arranged in the ring bearing on said compressible material, and formed with a ball-race, and balls engaging said ball-races, substantially as described.

2. In combination with a shaft, a bearing of the type set forth, comprising a pair of rings mounted one within the other, and another ring spaced therefrom on the shaft, means carried by the inner of the first-named rings and the last-named ring in which ball-races are formed, a compressible backing for the inner of the first-named rings, means for limiting the movement of said inner ring, comprising set-screws seated in the outer ring and having their inner ends projecting into a groove formed in the inner ring, and balls engaging said ball-races.

3. In combination with a shaft, a thrust-bearing comprising a ring, a second ring, a resiliently-mounted ring arranged in said last-named ring, means for limiting the movement of said last-named ring, said limiting means comprising coöperating elements carried by the second ring and engaging in the resiliently-mounted ring, balls, and means carried by said first and last named rings for engagement with said balls.

Signed by me at Cleveland, county of Cuyahoga and State of Ohio, this 22d day of July, 1901.

WALTER C. BAKER.

Witnesses:
W. E. DONNELLY,
E. B. DONNELLY.